United States Patent
Mahy et al.

(10) Patent No.: US 6,575,095 B1
(45) Date of Patent: Jun. 10, 2003

(54) METHOD AND APPARATUS FOR CALIBRATION

(75) Inventors: Marc Mahy, Wilsele (BE); Dirk Van Hoof, Malle (BE)

(73) Assignee: Agfa-Gevaert, Mortsel (BE)

( * ) Notice: Subject to any disclaimer, the term of this patent is extended or adjusted under 35 U.S.C. 154(b) by 181 days.

(21) Appl. No.: 09/685,676

(22) Filed: Oct. 10, 2000

Related U.S. Application Data

(60) Provisional application No. 60/162,042, filed on Oct. 28, 1999.

(30) Foreign Application Priority Data

Sep. 10, 1999 (EP) .............................. 99202958

(51) Int. Cl.$^7$ ................................ B41L 1/02; B41J 3/42
(52) U.S. Cl. ........................................... 101/485; 400/74
(58) Field of Search ................................ 101/485, 486, 101/211; 400/74; 355/327; 358/80, 504, 518, 522

(56) References Cited

U.S. PATENT DOCUMENTS

| | | | |
|---|---|---|---|
| 4,758,885 A | 7/1988 | Sasaki et al. ................. 358/80 |
| 4,852,485 A | 8/1989 | Brunner ...................... 101/211 |
| 4,929,978 A | 5/1990 | Kanamori et al. ............ 355/38 |
| 4,949,135 A | * 8/1990 | Ng .............................. 355/327 |
| 5,416,613 A | * 5/1995 | Rolleston et al. ........... 358/518 |

FOREIGN PATENT DOCUMENTS

| CH | 681929 | 6/1993 |
|---|---|---|
| EP | 0144188 | 11/1984 |

* cited by examiner

*Primary Examiner*—John Barlow
*Assistant Examiner*—An H. Do
(74) *Attorney, Agent, or Firm*—John A. Merecki

(57) ABSTRACT

A method and an apparatus for calibrating a printing device, the method including the steps of:

printing a wedge (10,11,12,13) by the printing device;

determining for at least one patch (21) of the wedge (10,11,12,13) a magnitude of a psychophysical or psychovisual quantity;

using the magnitude of the psychophysical or psychovisual quantity in calibrating the printing device.

14 Claims, 7 Drawing Sheets

| C | M | Y | K |
|---|---|---|---|
| 0% | 0% | 0% | 0% |
| 5% | 5% | 5% | 5% |
| 10% | 10% | 10% | 10% |
| 15% | 15% | 15% | 15% |
| 20% | 20% | 20% | 20% |
| 25% | 25% | 25% | 25% |
| 30% | 30% | 30% | 30% |
| 35% | 35% | 35% | 35% |
| 40% | 40% | 40% | 40% |
| 45% | 45% | 45% | 45% |
| 50% | 50% | 50% | 50% |
| 55% | 55% | 55% | 55% |
| 60% | 60% | 60% | 60% |
| 65% | 65% | 65% | 65% |
| 70% | 70% | 70% | 70% |
| 75% | 75% | 75% | 75% |
| 80% | 80% | 80% | 80% |
| 85% | 85% | 85% | 85% |
| 90% | 90% | 90% | 90% |
| 95% | 95% | 95% | 95% |
| 100% | 100% | 100% | 100% |

FIG. 2

METHOD AND APPARATUS FOR CALIBRATION

This application claims the priority of European Patent Application No. EP 99202958.7 filed on Sep. 10, 1999 in the designated state of Germany and U.S. Provisional Patent Application No. 60/162,042 filed on Oct. 28, 1999.

FIELD OF THE INVENTION

The present invention relates to the field of image rendering by means of printing devices, particularly multicolour output devices; the invention especially concerns calibration of these devices.

BACKGROUND OF THE INVENTION AND DEFINITION OF TERMS

A "colorant" designates in this document an independent variable with which a printing device can be addressed. A "colorant value", denoted as c, is an independent value that can be used to control a colorant of the printing device. The colorants of an offset printing press, for example, are the offset printing inks. It is customary to express the range of physically achievable values for the colorants of a device in %, which means that usually the colorant values range from c=0% to c=100%. In graphic arts, colorant values are often called dot percentages. A "colorant hue" is a basic colour of the printing device; the colorant hues of a traditional offset printing press and of a CMYK printer are cyan, magenta, yellow and black (as is customary, in this document C represents cyan, M represents magenta, Y represents yellow, K represents black and W represents white). The "hue" of an object denotes whether its colour appears red, orange, yellow, green, blue, or purple (or some mixture of neighbouring pairs in this list). "Hue" is also discussed under the 'definition of remaining terms' further below. A printing device with n colorants, wherein $n \geq 1$, will also be called below a "printer" or an "n-ink process". A printing device with colorants of at least two different colorant hues is called a "multicolour output device". An example of a multicolour output device is a CMY printer.

A "colorant space" is an n-dimensional space wherein n is the number of independent variables that are used to address the printer. In the case of an offset printing press, the dimension of the colorant space corresponds to the number of inks of the press.

A "colour space" is a space that represents a number of quantities of an object that characterise its colour. In most practical situations, colours will be represented in a 3-dimensional space that reflects some characteristics of the human visual system, such as CIE XYZ space (see "The Reproduction of Colour in Photography, Printing & Television" by R. W. G. Hunt, Fountain Press, England, fourth edition, 1987, ISBN 0 85242 356 X, sections 8.4 and 8.5 for CIE XYZ; this book is referenced to below as [Hunt]). However, other characteristics can also be used, such as multispectral values that are determined by means of a set of colour filters; a typical example is an m-dimensional space of which the axes correspond to densities.

A "colorant gamut" or "colorant domain" is the delimited space in colorant space of the colorant combinations that are physically realisable by a given printer.

A "printer model" is a mathematical relation that expresses the printer's output colour values as a function of the input colorant values for a given printer. The input colorant values are denoted as $c_1, c_2, \ldots, c_n$, wherein n is the dimension of the colorant space.

Because of the close relationship between an n-ink process and the printer model, the operations that are typical for a printer model are also defined for the corresponding n-ink process. The transformation of an n-ink process to colour space is equivalent to the transformation of the corresponding colorant domain to colour space by making use of the printer model.

A "colour gamut" is the delimited region in colour space of the colours that are physically realisable by a given printer, while also taking into account possible extra limitations on colorant combinations. Take for example a CMY output device. A CMY process is a three-ink process. The colorant gamut 16 is a cube in the three-dimensional CMY colorant space 17, as shown in FIG. 1. The colorant combinations in this domain 16 are transformed to colour space 18 by the printer model. The range of this transformation is the colour gamut 19 of the three-ink process. This transformation is represented in FIG. 1.

A "densitometer" is a photo-electric device that measures and computes how much of a known amount of light is reflected from—or transmitted through—an object, e.g. a receiving substrate such as paper or transparency film. A densitometer usually outputs a single value, i.e. a "density". In most densitometers, a colour filter selected from a set of available filters can be put into the light path to limit the used light to the wavelengths that are relevant for the colour of which the density is to be measured (see e.g. "Offsetdrucktechnik" by Helmut Teschner, seventh edition, 1990, Fachschriften-Verlag, Fellbach, ISBN 3-921217-14-8, pages 542 to 549, for more information on densitometers and densities).

A "calorimeter" is an optical measurement instrument that responds to colour in a manner similar to the human visual system (i.e. the human eye): a calorimeter measures the amounts of red, green and blue light reflected from an object, as seen by the human eye. The numeric values of the colour of the object are then determined in a colour space, such as the X, Y, Z values of the object's colour in CIE XYZ space.

A "spectrophotometer" is an instrument that measures the characteristics of light reflected from or transmitted through an object, which is interpreted as spectral data. To compute spectral data, a spectrophotometer may examine a number of intervals along the wavelength axis, e.g. 31 intervals of 10 nm, and then may determine for each wavelength interval the reflectance (or transmission) intensity, i.e. what fraction of the light is reflected (or transmitted).

Device Calibration

In general, colour is specified in a colour space that reflects some characteristics of the human visual system. Typical examples are CIE XYZ and CIELAB, but many more spaces exist such as appearance models (e.g. CIECAMs). In CIELAB space, a colour is represented by its three-dimensional co-ordinates (L*, a*, b*). Printers, however, cannot interpret colours specified in these spaces and hence conversions have to be made from such a space to the colorant space of the corresponding printer, e.g. from CIELAB space to CMYK space. This involves characterisation of the printer; see also FIG. 4.

"Characterisation" of a printer is concerned with modelling the printer so as to predict the printer's output colour values as a function of the input colorant values for the printer. The object of printer characterisation is not to change the device, but to describe how it works. Before a printer is characterised, it is first "calibrated", which means that the printer is put in a standard state; this is discussed below. Then, a characterisation target is printed by the printer. A characterisation target consists of a number of colour patches that are usually defined in the colorant space of the printer; a typical example of a characterisation target for a CMYK process is the IT8.7/3 target. To print a specific colour patch, the (CMYK) colorant values that correspond to the specific colour patch are used to address the printer. The colour patches of the printed characterisation target are then measured to determine their colour values, e.g. their colour co-ordinates L*, a* and b* in CIELAB space. A measuring device such as a colorimeter or a spectrophotometer may be used to determine these colour values. Based on the input colorant values, used to address the printer, and the measured corresponding output colour values, a printer model is created that predicts colour as a function of colorant values. This printer model is inverted to generate a "characterisation transformation" that transforms colours from colour space to colorant space. The characterisation transformation may be implemented e.g. as a "characterisation function", or as a "characterisation table" supplemented with interpolation techniques. As an example, FIG. 4 shows a characterisation table 40 that transforms colours having co-ordinates (L*, a*, b*) in CIELAB space to colorant values $c_C, c_M, c_Y, c_K$ in CMYK colorant space. The creation of the characterisation transformation to obtain the desired colours on the output device is called "device characterisation". Characterisation is also called "profiling", which means creating a file of data (a profile) that contains pairs of corresponding colour values and colorant values for the device. An often used profile is the ICC profile that meets the ICC standard; the ICC is the International Color Consortium.

If the colour values of a specific colour that is to be printed are known, e.g. the L*, a*, b* values in CIELAB space, the characterisation table can be used to calculate the colorant values that are to be used to address the printer in order to print the specific colour. However, to be able to reproduce colours in this way, the printer has to be kept in its standard state.

"Device calibration" is the action to put a device into its standard state; it involves running a check, preferably at regular points in time, to see whether the device has drifted away from its standard state. Device calibration especially applies to output devices, since they can be especially susceptible to drift: a monitor may lose brightness over time as phosphors fade; changes in room humidity or use of a fresh supply of toner or ink may cause a printer to produce different colour. The objective of device calibration, therefore, is to bring a device back to a known, standard state, so that it produces predictable colour every time it receives the same input colorant values. The present invention mainly deals with device calibration.

Current techniques for printer calibration use density measurements; usually the printing device prints a step wedge for each of its colorants; the patches of these wedges are then measured, e.g. by a densitometer, to determine the density of the patches. FIG. 2 shows an example for a CMYK printer that prints a cyan wedge 10, a magenta wedge 11, a yellow wedge 12 and a black wedge 13. Each wedge comprises one or more uniform patches, ranging e.g. from a colorant value c of 0% to 100% with steps of e.g. 5%; in this way, twenty-one patches per colorant are printed, such as patch 21 which is a cyan patch for c=50%. These wedges are the calibration target 15 upon which the calibration procedure is based. The colour characteristics of the printed wedges depend on the printer that is calibrated, and also on the type of receiving substrate and the types of "marking particles", such as liquid ink drops, that are applied by the printing device to the receiving substrate. Therefore, when calibrating a printer, preferably always the same receiving substrate and the same marking particles are used. Two known methods are now described that use density measurements of the wedges.

In a first known method, each wedge is measured by means of a densitometer and the measured densities are compared to the reference densities that were measured initially, i.e. in the factory or when the printer came fresh from the factory. If the measured densities are different from the reference densities, the device has to be recalibrated. This is done by applying a one-dimensional lookup table (or LUT) per colorant before the colorant values c are sent to the printer. The LUT is filled out in such a way that the densities of the resulting step wedge are the reference densities. These one-dimensional lookup tables are also called calibration curves. FIG. 4 is an example in CMYK space showing LUT's or calibration curves 45, 46, 47 and 48 that transform the colorant values $c_C, c_M, c_Y,$ and $c_K$, resulting from the characterisation table 40, into values $t_C, t_M, t_Y, t_K$ that are called "tone values", denoted as t, in this document.

In a second known method, which is very common, density measurements are used to determine dot gain and the purpose of the calibration method is to keep the dot gain values equal to a given set of reference dot gain values. "Dot gain" is the increase of halftone dots used in the printing process, due to the characteristics of marking particles, receiving substrate, printer. A first part of dot gain, called physical dot gain, is related to the spreading of the marking particles (e.g. ink) when a dot is printed onto the receiving substrate so that the density produced is greater than would be expected; some factors affecting dot gain are the thickness of the applied layer of marking particles, the physical properties of the marking particles (such as viscosity), the nature of the surface of the receiving substrate (such as whether it is glossy or matt). A second part of dot gain, called optical dot gain, is related to optical effects, especially light scattering. Optical dot gain depends on the properties of the receiving substrate. Suppose that the receiving substrate is paper; because of light scattering effects in the paper, a part of the incident light penetrates into the paper below the paper surface, and is reflected inside the paper, but the reflected light gets trapped under the dots and is absorbed by the underside of the dots. Therefore, the optically effective area of dots, printed on paper, is larger than the optically effective area of the same dots on a transparent material such as photographic film, when observed by means of the human visual system or when measured by a densitometer. A human observer will perceive a more intense colour on the paper than on the film and a larger density will be measured by a densitometer. Dot gain is important; if it is not under control, so that e.g. the printed dots of one or more colours are larger than desired, the printed image may exhibit a colour deviation.

Dot gain is defined as the difference between the assessed optically effective percent area coverage $a_{eff}$ of the printed dots and the colorant value c used to address the printer in order to print these dots:

dot gain=$a_{eff}$−c

To assess the optically effective percent area coverage $a_{eff}$, the Murray-Davies equation is commonly used:

$a_{eff}$ (in %) according to Murray-Davies $$a_{eff} \text{ (in \%) according to Murray-Davies} = 100 * \frac{1 - 10^{-D_c}}{1 - 10^{-D_s}}$$

with:

$D_C$ the density of the printed halftone dots;

$D_S$ the "solid density", i.e. the density of the printed 100% patch.

The Murray-Davies equation is based on the assumption that the optically effective percent area coverage $a_{eff} = A_C/A_S$, wherein $A_C$ and $A_S$ represent the quantity of light absorbed by respectively the printed halftone dots and the printed 100% patch. Thus, the solid density $D_S$ is used as a reference with which the density $D_C$ of the printed halftone dots is compared.

Some densitometers provide an operating mode wherein they directly indicate the dot gain instead of the density; generally, dot gain is then calculated by means of the Murray-Davies equation.

It has been known that the Murray-Davies equation is not completely accurate; in fact, many factors are involved in dot gain, and it is very complicated or even impossible to model them. The Yule-Nielson equation proposes a correction factor for the Murray-Davies equation but is rarely used. Dot gain is often characterised by dot gain curves, that give dot gain as a function of the colorant value c. A dot gain curve may be determined by measuring densities and applying the Murray-Davies equation. FIG. 3 shows a dot gain curve 57 that is typical for offset printing systems: for a colorant value c of 50%, the dot gain is 15%. This means that the optically effective percent area coverage $a_{eff}$ of the printed dots will be $a_{eff}=50+15=65\%$ if a colorant value of 50% is used to address the concerned offset press. Of course, a dot gain curve must be determined for each colorant of the printer; the dot gain curves also depend on the type of printer, receiving substrate, marking particles.

The purpose of the calibration method that uses dot gain is to keep the actual dot gain values equal to a given set of reference dot gain values. This may be accomplished as follows. For a specific colorant, the reference dot gain curve is given. This reference dot gain curve may be determined by printing and measuring a step wedge initially, i.e. in the factory or when the printer comes fresh from the factory. Often, however, the reference dot gain curves are defined and are not necessarily measured. The reference dot gain curves are typically curves with a dot gain of 15% at c=50%. The printing device now prints a calibration target, such as calibration target 15 shown in FIG. 2. The dot gain values of the calibration target are assessed, e.g. by measuring the densities of the step wedges in the calibration target, using the Murray-Davies equation and calculating the dot gain. The assessed dot gain values are compared with the reference values of the reference dot gain curves; if the assessed values are different from the reference values, a one-dimensional lookup table (or LUT) is applied per colorant before the colorant values c are sent to the printer. These one-dimensional lookup tables are also called calibration curves; FIG. 4 shows calibration curves 45, 46, 47, 48. The LUT is filled out in such a way that the dot gain values of the resulting step wedge are the reference dot gain values.

The above mentioned method to determine dot gain and the optically effective percent area coverage $a_{eff}$ has been used for quite some time for binary halftoning; it can be applied to multilevel halftoning techniques as well. In "multilevel halftoning", more than two different amounts of marking particles can be deposited by the printer onto the receiving substrate to form one microdot. A "microdot" is the smallest dot that can be addressed by the printer for application of a specific amount of marking particles; a halftone dot is composed of a number of microdots.

Dot gain, optical dot gain, the Murray-Davies equation, are discussed in "Offsetdrucktechnik" by Helmut Teschner, seventh edition, 1990, Fachschriften-Verlag, Fellbach, ISBN 3-921217-14-8, on pages 549 to 555.

FIG. 4 shows a Colour Management System (CMS) that comprises a characterisation table 40 and calibration curves 45, 46, 47 and 48. The purpose of a CMS is to provide colour consistency and predictability. In FIG. 4, the colour space is CIELAB and the colorant space is CMYK, but other spaces may be used, such as an RGB colorant space. The device independent CIELAB colour values (L*, a*, b*) are transformed by the characterisation table 40 to device dependent CMYK colorant values $c_C$, $c_M$, $c_Y$, $c_K$, which are then corrected to tone values $t_C$, $t_M$, $t_Y$ and $t_K$ by the calibration curves 45, 46, 47, 48. To print the characterisation target, preferably only calibration curves are used and no characterisation table is applied. To print the calibration target, preferably no characterisation table is applied and preferably no calibration curves are applied. A case wherein several calibration curves are applied subsequently is shown in FIGS. 4 to 5 (FIG. 5 is discussed in detail further below): $t_{C1}$** is obtained from $c_c$ by applying successively calibration curve 45, ink mixing table 31, single ink calibration curve 42 and screening LUT 66. In such a case, LUT 66 may be filled out first, after which calibration curve 42 may be determined and then calibration curve 45. To determine calibration curve 45 in this case, preferably the calibration curve 45 itself, that is to be determined, is not applied in printing the calibration target (or curve 45 is replaced by a one-to-one LUT, i.e. by a unity transformation), and calibration curve 42 and LUT 66, that were determined previously, are preferably applied. The advantage of not applying the calibration curves, that are to be determined, in printing the calibration target, is that the new calibration curves for the device are directly determined from the device's standard state and from measurements of the calibration target. This 'direct' method is simpler and more accurate than the 'indirect' method that involves applying the 'old' calibration curves when printing the calibration target. Applying the 'old' calibration curves is more cumbersome: it requires measuring the printed calibration target and comparing the measurements to known reference values that represent the standard state of the device. If the comparison shows that the device has drifted away from its standard state, it has to be recalibrated. Recalibration may be done by printing a calibration target without applying the concerned calibration curves, as explained above. It may also be done by calculating the 'new' calibration curves from the measurements of the calibration target and from the 'old' calibration curves, but this is less accurate than the direct method.

Failure of Conventional Printer Calibration

To calibrate a printer, densities will in general do a good job. However, it would be advantageous that, if some characteristics of the printing system were changed, the same calibration procedure and characterisation table could be used. In general, it is not possible to obtain the same colours on the receiving substrate, by using the same calibration technique and the same characterisation table, if a characteristic of the printing system has been changed. Moreover, quite a lot of printers are not stable at all and hence it is important to design a calibration system that is as robust as possible.

A first example is a CMYK offset printing system with two different types of screening. For a first set of images, conventional screening (Amplitude Modulation or AM screening) is used such as Agfa Balanced Screening™ (ABS) at a line ruling of 150 lpi, and for a second set of images, Frequency Modulation (FM) screening is applied such as CristalRaster™ (CR). The ABS technique is disclosed in U.S. Pat. No. 5,155,599, the CR technique is disclosed in U.S. Pat. No. 5,818,604. Both screening systems differ significantly. The dot gain e.g. in CristalRaster™ is much higher than in ABS. Nevertheless we would like to use the same characterisation table, and, preferably, also the same calibration procedure for an image screened with ABS and for an image screened with CR, so that no new characterisation, and, preferably, no recalibration is necessary if a differently screened image is to be printed. As shown schematically in FIG. 5, screening dependent calibration curves or LUT's 66, 67, 68, 69 may be used (screening dependent lookup tables are disclosed in EP-A-0 639 023). For example, screening algorithms 61 and 63 are ABS while 62 and 64 are CR. In FIG. 5, selector switches 71 and 72 are set to ABS; thus, in FIG. 5 the current image is screened using ABS. For an image screened in CR, selector switch 71 will be set to screening algorithm 62 and LUT 67 while switch 72 will be set to screening algorithm 64 and LUT 69. The LUT's 66 and 68 are filled out in such a way that the dot gain values of the printed step wedge are the reference dot gain values when ABS is used, while LUT's 67 and 69 are filled out in such a way that the dot gain values of the printed step wedge are the reference dot gain values when CR is used. In this way, the measured dot gain values will be the reference dot gain values, whether ABS is used or CR. However, there will be a significant difference from a visual point of view between an image screened with ABS and an image screened with CR, when calibration uses densities. This is due to the fact that the optical and physical dot gain, and the thickness of the ink layer in ABS and in CristalRaster™ are different. Moreover, the result highly depends on the colour filter that is used in the densitometer to measure the densities. Therefore, an observer will see a significant difference between an image screened with ABS and an image screened with CR.

A second example is a printer for which the amount of ink, applied to the receiving substrate, changes over time for given colorant values. Suppose for example that the amounts of yellow and magenta inks that are really deposited on the receiving substrate increase over time for given colorant values. Thus, a printed 100% patch of yellow ($c_Y$=100) will look too yellow and a printed 100% patch of magenta ($c_M$=100) will look too magenta. Using a calibration method that involves dot gain, as described above, will not solve this problem: a yellow 100% patch will remain too yellow, a magenta 100% patch will remain too magenta, the whole printed image will show a colour cast. In fact, a dot gain curve usually gives 0% dot gain for a colorant value c of 100% (see also FIG. 3) and the Murray-Davies equation is relative to the 100% patch, therefore, a calibration method using densities and dot gain does not work in this case.

A third example relates to printing devices, e.g. ink-jet printers, with two or more inks for the same colorant, e.g. two cyan inks. The main idea is to increase the visual resolution of the printer by attaining a higher resolution of optical densities (as opposed to spatial resolution). This is obtained by using inks that have the same colorant hue but a different colouring power and may be realised by using different concentrations of dyes or pigments in the inks. A multicolour output device, that uses a light and a dark cyan ink and a light and a dark magenta ink, can reproduce e.g. pastels at an apparent higher density resolution by making use of the light inks than if only the dark inks would be used. This is because the dots are more visible in light coloured areas when only dark inks are used, especially when using a screening technique such as error diffusion. Because the light inks barely increase the gamut of the devices, colorants which only differ in colouring power may be addressed by one single colorant value without a significant loss of colour gamut, e.g. light and dark cyan may be addressed by one value $c_C$. This is obtained by means of so called ink mixing tables, that transform colorant values into different amounts of inks. In FIG. 5 an ink mixing table 31 is shown for a printer with light and dark cyan ink; the cyan tone value $t_C$, which results from the cyan colorant value $c_C$, see FIG. 4, is transformed by ink mixing table 31 into values $t_{C1}$ and $t_{C2}$ that ultimately determine respectively an amount of light cyan ink and an amount of dark cyan ink that is to be applied to a receiving substrate. Values $t_{C1}$ and $t_{C2}$ are preferably transformed by single ink calibration curves 42 and 43 into calibrated values $t_{C1}*$ and $t_{C2}*$, after which screening dependent calibration LUT's 66 to 69 and screening algorithms 61 to 64 may be applied as described above. Preferably, calibration is done in two steps: calibrating the single inks c1, c2, which corresponds in FIG. 5 to filling out LUT's 42 and 43, and calibrating the 'ink mixture(s)', which corresponds in FIG. 4 to filling out LUT's 45 to 48. In this way, a multicolour output device with two or more inks for the same colorant may be addressed e.g. by the traditional colorant values $c_C$, $c_M$, $c_Y$, and $c_K$, but a colorant value c may correspond to a mixture of several inks. If in such a multicolour output device the calibration is performed by measuring densities and calculating dot gains from the measured densities, severe banding may occur, even in e.g. a cyan colour gradation. The cause is that in the Murray-Davies equation the densities $D_C$ and $D_S$ are compared to each other, i.e. two densities are compared that are obtained by means of different inks with different concentrations. The traditional calibration method using dot gain thus results in degraded image quality when applied to printing devices with two or more types of marking particles that have the same colorant hue.

OBJECTS OF THE INVENTION

It is therefore an object of the present invention to provide a calibration method and a system therefore that take into account changes of characteristics of the printing system.

It is an object of the present invention to provide a calibration method and a system therefore that are robust with respect to printer instability.

DEFINITION OF REMAINING TERMS

A "quantity" and a "magnitude", as referred to in the invention as claimed, are defined as follows. A "quantity" is the character of something that makes it possible to measure or number it or to determine that it is more or less than something else (see 'Webster's Third New International Dictionary', 1993). A "magnitude" is the number or value of a quantity for a specific object. For example, if the length of a car is 4.5 m, then "length" is the quantity, "4.5" is the magnitude and "m" (meter) is the unit.

It is generally agreed that colours have three main perceptual attributes: "hue", "colourfulness" and "brightness"; see also [Hunt], section 7.2.

As mentioned already above, "hue" denotes whether the colour appears red, orange, yellow, green, blue, or purple (or some mixture of neighbouring pairs in this list).

"Colourfulness" denotes the extent to which the hue is apparent; colourfulness is thus zero for whites, greys and blacks (which are also referred to as neutral colours), colourfulness is low for pastel colours and is (normally) high for the colours of the spectrum. "Saturation" and "chroma" are terms that are related to colourfulness (see also [Hunt], section 7.2).

"Brightness" denotes the extent to which an area appears to exhibit light; brightness is thus, usually: extremely high for the sun, very high for many other sources of light, high for whites and yellows, medium for greys and browns, and low for blacks. "Lightness" and "luminance" are terms that are related to brightness (see also [Hunt], section 7.2).

A "psychophysical quantity" is a quantity PPQ that can be written as:

$$PPQ = T\left(\sum_{i=1}^{N} W_i \times Q_i\right)$$

wherein:

T is a single transformation or a set of successive transformations; each transformation out of the set may be either a linear transformation (such as $A*(\Sigma W_i*Q_i)+B$) or a non-linear transformation; T may also be the unity transformation—the output of the unity transformation equals the input, so that in this case $PPQ=\Sigma W_i*Q_i$;

the sum $\Sigma W_i*Q_i$ includes one or more terms, i.e. $N \geq 1$;

each term of the sum is the product of a factor $W_i$ and a factor $Q_i$;

the weighting factors $W_i$ depend on the sensitivity to colour of the human visual system;

the factors $Q_i$ are physical quantities or transformations of physical quantities;

the sum $\Sigma W_i*Q_i$ may also be an integral, such as $\int W(\lambda)*Q(\lambda)*d\lambda$ wherein $\lambda$ represents wavelength. This definition is now illustrated by an example, without the intention to limit the definition thereto. Suppose that it is necessary to describe quantitatively the colour of a certain paint when viewed under illumination of a standard tungsten light source, that is, a tungsten lamp operating at a certain filament temperature. The first step is to measure the reflectance of the paint for wavelengths throughout the visible spectrum. This may be done by the use of a spectrophotometer that measures the reflectance e.g. every 10 nm at 31 wavelengths; the value of the reflectance at a given wavelength $\lambda$ is symbolised as $R_\lambda$. The next step is to multiply $R_\lambda$ by the relative amount of light $L_\lambda \Delta\lambda$ emitted at the same wavelength, wherein $\Delta\lambda$ is the length, e.g. 10 nm, of a wavelength interval. The product $R_\lambda L_\lambda \Delta\lambda$ describes the amount of light actually emerging from the paint in a wavelength interval $\Delta\lambda$ at wavelength $\lambda$. Next, $R_\lambda L_\lambda \Delta\lambda$ is multiplied by the amount $\bar{x}_\lambda$ at the same wavelength $\lambda$ of the first colour matching function $\bar{x}$ for the CIE tristimulus values X, Y and Z (see [Hunt], page 105, FIG. 8.6). This product, $\bar{x}_\lambda R_\lambda L_\lambda \Delta\lambda$, is summed over all wavelength intervals to obtain the quantity $X=\Sigma \bar{x}_\lambda R_\lambda L_\lambda \Delta\lambda$. The same procedure is repeated with the second and third colour matching functions, $\bar{y}$ and $\bar{z}$, to obtain respectively $Y=\Sigma \bar{y}_\lambda R_\lambda L_\lambda \Delta\lambda$ and $Z=\Sigma \bar{z}_\lambda R_\lambda L_\lambda \Delta\lambda$. The numbers X, Y and Z are the desired result: they quantitatively describe the colour of the paint in the CIE XYZ space (see also the "McGraw-Hill Encyclopedia of Science and Technology", 1977, ISBN 0-07-079590-8, under 'Color'). The quantity X is a psychophysical quantity: the weighting factors $W_i$ are the amounts $\bar{x}_\lambda$ of the colour matching function $\bar{x}$, and $\bar{x}$ depends on the sensitivity to colour of the human visual system (see [Hunt], sections 8.4, 7.3 and 7.4) and the factors $Q_i$ are the physical quantities $R_\lambda L_\lambda \Delta\lambda$. Similarly, Y and Z are psychophysical quantities.

A "psychovisual quantity" PVQ is a psychophysical quantity for which differences of equal visual magnitudes for the human visual system correspond to substantially equal differences of the magnitude of PVQ. Let |q| represent the absolute value of q. Suppose that visual differences of a given magnitude, that are just noticeable by the human eye, correspond to differences in PVQ of which $(\Delta PVQ)_{max}=|PVQ_B-PVQ_A|$ is the largest and $(\Delta PVQ)_{min}=|PVQ_D-PVQ_C|$ is the smallest difference (see also [Hunt], section 8.6: "Uniform chromaticity diagrams" and section 8.8: "Uniform colour spaces"). PVQ is a psychovisual quantity if $(\Delta PVQ)_{max}<R*(\Delta PVQ)_{min}$, with R<10, preferably R<5, more preferably R<3, even more preferably R<2 and most preferably R<1.5. "High quality psychovisual quantities" have a low value of R. For example CIE lightness L* and CIE chroma C* are high quality psychovisual quantities. The psychophysical quantity Y, from the CIE XYZ system, indicates brightness but it does not represent a uniform visual scale: to a human observer, the apparent difference between e.g. two samples of Y=10 and Y=15 is much greater than that between two samples of Y=70 and Y=75. On the contrary, CIE lightness, L*, is a psychovisual quantity: equal increments on the L* scale do represent approximately equal steps in the perceived lightness of related colours.

A "colour distance" is a Euclidean or non-Euclidean distance in a colour space, which has a dimension $m \geq 1$, or in a subspace of the colour space. A colour distance between two patches of a wedge is the colour distance between the two points that correspond, in the concerned colour space or subspace, to the two patches (e.g. a point with co-ordinates X1, Y1, Z1 corresponds in CIE XYZ space to a patch that has X1, Y1, Z1 colour values in CIE XYZ space).

A "marking particle" is a particle that is applied to a receiving substrate by the printing device. The printing device may apply different types of marking particles to the receiving substrate. Marking particles of a specific type may contain a specific material such as a dye or a pigment to give the marking particles a specific colour; the colour of marking particles is called in this document the "colorant hue" of the marking particles. Different types of marking particles may have the same colorant hue; e.g. light cyan marking particles and dark cyan particles both have the same colorant hue, namely cyan. In ink-jet printing, the marking particles are liquid ink drops. In thermal transfer printing and in laser induced melt transfer printing, the marking particles are usually melted wax ink particles. In electro(stato)graphic printing, the marking particles are toner particles; liquid electrostatographic development (using a dispersion of solid toner particles in a dielectric liquid) as well as dry electrostatographic developers may be used. The colorant values of marking particles, when applied to a receiving substrate (e.g. fused to the receiving substrate in case of toner particles), may be different from the colorant values of the original marking particles; therefore, the colorant values referred to are those of the marking particles appearing on the receiving substrate.

A "receiving substrate" may be a separate sheet or it may be a continuous web; it may be made of paper, of polyethylene coated paper, of plastic, of white poly(ethylene terephtalate), it may be a laminate of paper and plastic; it may be transparent or opaque; several kinds of receiving substrate are described in patent application EP-A-768 577. Measurements concerning colour have a different nature if the receiving substrate is opaque or transparent; e.g. for densities, on an opaque receiving substrate the measured densities are reflection densities, while transmission densities are measured on a transparent receiving substrate.

A "colour proof" of a colour image is required for inspection and approval by the printer or his client before the colour image is printed on the production printing press. To make a traditional off-press proof, colour separations of the image (e.g. a cyan, a magenta, a yellow and a black separation) are produced on a substrate which may be a black and white photographic film; these colour separations are then used to make the colour proof of the image.

In "digital colour proofing", the digital data that represent the colour image are directly sent to a high resolution, high-quality printer that prints the colour proof on a receiving substrate, thus omitting the intermediate step of producing colour separations on a substrate.

SUMMARY OF THE INVENTION

The above mentioned objects are realised by a method and a system in accordance with the present invention as claimed in the independent claims. The dependent claims set out preferred embodiments of the invention.

As will become apparent from the following description and drawings, some of the disclosed embodiments do not require all the features of the invention as claimed in the independent claims; some of these disclosed embodiments may be the subject of a divisional application of the present patent application.

Preferably, the printed wedges are step wedges, that include a number of adjacent patches. However, a printed wedge may also be simply a set of non-adjacent patches or a wedge may consist of only a single patch. The surface area of each patch may be e.g. 15 mm×15 mm, but it may also be much smaller, or larger. The surface area should be large enough so that the magnitude of the first quantity that is determined is representative for the concerned patch. For example, for a patch that has a colorant value of 2% and that is printed using an error diffusion screening method, the surface area of the patch should be large enough to have a correct proportion of the (small) printed area to the (large) non-printed area; thus, the minimum required surface area of a 2% patch may be larger than the minimum required surface area of a 100% patch.

A magnitude of the first quantity q1 is determined for at least one and preferably for each patch of the first wedge, i.e. a magnitude $m1_A$ is determined for patch A of the first wedge, a magnitude $m1_B$ for patch B, $m1_C$ for patch C, etc. The first quantity q1 is a psychophysical quantity, preferably a psychovisual quantity, more preferably a high quality psychovisual quantity. Moreover, the first quantity is preferably determined with respect to a reference value which is the magnitude of q1 for the receiving substrate itself and which is, for paper, the so-called 'white of the paper' (see also [Hunt], page 116, the 'reference white being used'). A magnitude of q1 may also be determined for just one patch; in this case, preferably a magnitude of q1 is also determined for the receiving substrate itself in an area where no marking particles are applied.

In a preferred embodiment, the first quantity q1 is used in determining a magnitude $m1_{AB}=d_1(A,B)$ of a colour distance $d_1$ between a patch A of the first wedge and a patch B of a reference wedge, with $d_1$ a specific colour distance that is based on q1. As discussed further below, the reference wedge may represent a standard state of the device; in another case, the reference wedge may be the first wedge itself, so that patches A and B both belong to the first wedge. Preferably, magnitudes of $d_1$ are determined for several pairs of patches. The magnitudes of the colour distance between these patches are then used in calibrating the printing device.

Preferably, the printing device is a multicolour output device.

Two or more different wedges are printed; the wedges may be different in that a type of marking particles is used in printing the second wedge that is not used in printing the first wedge. A magnitude of a second quantity q2 is determined for at least one and preferably for each patch of the second wedge. The second quantity q2 is different from the first quantity q1; the magnitude(s) of q2 are also used in calibrating the printing device. The same preferences, mentioned for q1, apply for q2: preferably the second quantity q2 is a psychophysical quantity, more preferably a psychovisual quantity, most preferably a high quality psychovisual quantity; moreover, the second quantity is preferably determined with respect to a reference value which is the magnitude of q2 for the receiving substrate itself.

If the first wedge is a cyan wedge, a magenta wedge or a grey wedge, where a grey wedge is printed using black marking particles, the first quantity q1 preferably indicates brightness. For a yellow wedge, the determined quantity preferably indicates brightness and more preferably colourfulness. CIE lightness L* is a quantity that indicates brightness while CIE chroma C* indicates colourfulness; some other quantities indicating brightness or colourfulness may be found in [Hunt], section 7.2.

In a particular embodiment, a grey wedge is printed and a magnitude of the density is determined for at least one and preferably for each patch of the grey wedge.

An advantage of the invention is that a psychophysical or psychovisual quantity is determined, so that characteristics of the human visual system may be incorporated into the calibration method. An advantage of using a psychovisual quantity is related to the spacing of different colour shades over the available tonal range, which is discussed further below. An advantage of printing two or more different wedges and determining magnitudes of different quantities for the first and for the second wedge is that the choice of the quantities that are determined for the colorants of the printing device may be optimised for a given purpose. For one or more colorants, a psychophysical or a psychovisual quantity is determined, so that characteristics of the human visual system may be incorporated into the calibration method where they are desired. For other colorants, calibration may be based on density measurements or dot gains.

The invention may be applied to printing devices that use one type of marking particles per colorant. The invention may also be applied to printing devices using, for at least one colorant, two or more types of marking particles per colorant, e.g. light cyan marking particles and dark cyan marking particles as described above. In the latter case, the invention may be applied to a first kind of wedges that are printed to determine a LUT that is applied after a mixing table, such as LUT's 42 and 43 in FIG. 5, discussed above under single ink calibration; the invention may be applied to a second kind of wedges that are printed to determine a LUT that is applied before a mixing table, such as LUT's 45 to 48 in FIG. 4, discussed above, that may pertain to a mixture of several types of marking particles; the invention may be applied to both the first and the second kind of wedges.

Preferably, to calibrate a printing device that uses, for one or more specific colorants, two or more types of marking particles per colorant, magnitudes of a psychophysical or psychovisual quantity are determined for one or more and most preferably for all wedges of the specific colorants.

The invention may also be applied to wedges that are printed in determining a screening dependent LUT such as LUT's 66 to 69 in FIG. 5, discussed above. The invention may also be applied to a combination of these wedges, e.g. to a wedge printed to determine LUT 46 and another wedge printed to determine LUT 42, or to wedges printed to determine respectively LUT's 47 and 66, etc.

To summarise, the invention may be applied to any wedges of which magnitudes of a quantity are determined to be used anywhere in the calibration process of the printing device.

In a calibration method according to the invention, one or more magnitudes of a psychophysical or psychovisual quantity are determined as discussed above, but these magnitudes may be used in various ways in calibrating the printing device. Moreover, either the determined magnitudes may be used directly to calibrate the device, or a transformation, as known in the art of colour management, may be applied to the determined magnitudes before they are used in calibrating the device.

Determining, for at least one patch of a wedge, a magnitude of a quantity, may be carried out in different ways. The quantity, such as lightness or chroma, may be determined directly by means of a measuring instrument—e.g. a colorimeter such as X-Rite's model 948 (available from X-Rite, Grandville, Mich., USA) measures the amount of red, green and blue light reflected from a patch; this calorimeter uses CIE XYZ as the reference colour space and then converts the measured calorimetric data from CIE XYZ into CIE L*a*b* co-ordinates. Alternatively, a spectrophotometer may be used and the measured spectral data may be transformed into the desired quantity with a few calculations. Since a spectrophotometer is a very expensive instrument, in another embodiment a human observer visually determines the quantity, e.g. by visually comparing the concerned patch with a set of standard colour patches, such as patches from the Munsell colour atlas, of which the magnitude of the concerned quantity is known; this method of working takes time but is inexpensive and quite accurate, since the human eye is very sensitive to colour differences. In yet another embodiment, densities are measured using a densitometer that is fitted with suitable filters. Instead of directly using the measured densities or dot gains for calibration, as in traditional calibration methods, this embodiment according to the invention transforms the measured densities to magnitudes of quantities that include a psychophysical or psychovisual quantity. The transformation may be carried out by software and may include characteristics of the human visual system and models of the filters that are used in the densitometer and of the reflection properties—or the transmission properties—of the printed image. Such a model may then reconstruct spectral data from the measured density values, the characteristics of the used filters and the characteristics of the image printed on the receiving substrate. The accuracy of the reconstructed spectral data depends for a large part on the way in which the marking particles are applied to the receiving substrate to make up the printed image. The accuracy may be very high if different types of marking particles are on top of each other on the receiving substrate (such as in a colour photo that contains successive layers of dyes); the accuracy is much lower if the marking particles are applied next to each other, as in traditional offset printing. Moreover, each step in the transformation usually introduces an extra inaccuracy. Thus, for better accuracy, it is generally advantageous to determine psychophysical or psychovisual quantities in a direct way, e.g. by using a spectrophotometer or a calorimeter, instead of determining them via densities and a transformation. In still another embodiment, a CCD camera is used instead of a densitometer; the CCD camera may be equipped with filters, preferably with three RGB filters, and a transformation may be used to transform the assessed RGB values into e.g. CIELAB values, which are values of psychovisual quantities.

A system in accordance with the invention is claimed in claim 9. The printer, or printing device, may be a multicolour output device. The first and second quantifiers may either be the same quantifier (in which case both the first and the second magnitudes are determined by this same quantifier) or they may be different (e.g. the first quantifier may comprise a calorimeter and the second one may comprise a densitometer instead). The first and second calibrators may either be the same calibrator or they may be different. Preferably, the first calibrator or the second calibrator, more preferably both calibrators comprise calibration curves or LUT's such as calibration curves 45 to 48 and 42 to 43 and LUT's 66 to 69 discussed above.

To improve readability, "the quantifier" in the description below indicates the first or the second quantifier or both quantifiers, while "the calibrator" indicates the first or the second calibrator or both calibrators.

The quantifier may comprise a measuring instrument, such as a densitometer, or, which is preferred, a calorimeter or a spectrophotometer, and the quantifier may comprise a transforming device, preferably a calculating device, to transform one or more quantities, that were determined in a previous step, into quantities that are used for the calibration. The quantifier and the calibrator are provided by a system that comprises the printing device and that may comprise other devices such as a measuring instrument, a calculating device such as a computer, etc. The quantifier may be provided in many different ways by the devices that constitute the system, as is clear to those skilled in the art: the printing device may comprise a measuring instrument and a transforming device; the transforming device may be provided by a separate computer; magnitudes of a specific quantity may be determined in the printing device while magnitudes of another quantity may be determined by a separate measuring device; etc.

Preferably, the system also comprises a transmitter for transmitting signals from the quantifier to the printing device, and more preferably also from the printing device to the quantifier. In this way, the determined magnitudes may be transmitted from the quantifier to the printing device, e.g. by means of electrical or optical signals, by wire or wireless such as by electromagnetic waves. The determined magnitudes, or values based thereon, may then be stored in a memory in the printing device.

In a preferred embodiment, the system includes a mover for moving the receptor support during printing and the mover has a gripper for gripping the receptor support during the moving operation. The gripper may be a mechanical gripper including e.g. one or more rollers, sprocket wheels, friction wheels; any gripper as known in the art may be used. Preferably, the receiving substrate is still being gripped by the gripper during operation of the quantifier, i.e. when the magnitudes are determined for the patches of the wedge or wedges of the calibration target. This 'mechanical coupling' of the quantifier to the printing device via the receiving substrate and the gripper is discussed more in detail below, after the discussion of an important advantage.

Increased user convenience is an important advantage of the embodiment that has a transmitter for transmitting signals and especially of the embodiment wherein the quantifier is 'mechanically coupled' to the printing device via the receiving substrate and the gripper. In the latter case, calibration may only require that the printing device is provided with a receiving substrate and is instructed to calibrate itself—the calibration procedure may then be performed automatically, i.e. without intervention from the user. On the other hand, a lot of intervention from the user is required in case the quantifier is not 'mechanically coupled' to the printing device via the receiving substrate and the gripper. Suppose for example that a separate measuring instrument is to be used. In such a case, the user first has to instruct the printing device to print a calibration target, then he has to transfer the receiving substrate on which the calibration target is printed from the printing device to the measuring instrument, subsequently he has to instruct the measuring instrument to do the desired measurements or he may even have to move the patches that are to be measured manually through the measuring instrument so that the next patch may be measured, then he has to transfer the determined magnitudes, which may be obtained from these measurements either directly or by an intermediate step such as a transformation on a specific calculating device, to the printing device, etc.

The 'mechanical coupling' of the quantifier to the printing device via the receiving substrate and the gripper may be realised in different ways. The mover, that includes the gripper, may be part of the printing device. An example is a printing device that has a transport mechanism that transports separate sheets of receiving substrate through the printing device. The mover may also be a device that is separated from the printing device; in case the receiving substrate is supplied to the printing device as a continuous web, the mover may include a supply spool that provides the web to the printing device, an uptake spool that receives the printed web, and a transport mechanism that transports the web through the printing device. In a first embodiment, the mover moves the receiving substrate, via the gripper, 'through' the quantifier during operation of the quantifier. In a second embodiment, the quantifier has its own, additional mover so that the receiving substrate is moved with respect to the quantifier by the additional mover of the quantifier. Remark: the receiving substrate is preferably moved with respect to the quantifier in order to determine the magnitude for the next patch; what is important is that the movement is relative, i.e. the receiving substrate may also remain in its position while the quantifier is moved. Many other embodiments may be envisioned by the person skilled in the art to realise the 'mechanical coupling'; it is important that the 'mechanical coupling' allows operation of the quantifier without requiring the user to transport the receiving substrate manually from the printing device to the quantifier.

Preferred embodiments of a system in accordance with the invention may include features of a method—as claimed or as described above or below—in accordance with the invention; e.g., in an embodiment of a system in accordance with the invention, the first quantifier is for determining a psychophysical quantity, preferably a psychovisual quantity, more preferably a high quality psychovisual quantity; e.g., for a yellow wedge, the quantity of which magnitudes are determined preferably indicates brightness and more preferably colourfulness.

Further advantages and embodiments of the present invention will become apparent from the following description and drawings.

BRIEF DESCRIPTION OF THE DRAWINGS

The invention is described with reference to the following drawings without the intention to limit the invention thereto, and in which:

FIG. 2 shows a calibration target consisting of four step wedges;

DETAILED DESCRIPTION OF THE INVENTION

In a first embodiment, a wedge is printed per colorant of a multicolour output device that is to be calibrated and each colorant is calibrated separately. For each specific wedge, magnitudes of a specific quantity are determined. Which quantities are determined is preferably chosen so that the quantities change in a uniform smooth way, preferably in a substantially linear way, as a function of the colorant values of the patches of the concerned wedge. An example illustrating this first embodiment is a CMYK printer for which the quantity CIE lightness $L^*$ is determined for the black (K), cyan (C) and magenta (M) patches, while the quantity CIE chroma $C^*$ is determined for the yellow (Y) patches. An advantage of determining chroma for yellow and using it for the calibration is that the calibration is much more stable than if e.g. lightness would be used. In fact, the difference in lightness $\Delta L^*$ between the 0% the 100% yellow patch is very small, approximately $\Delta L^*=10$, so that it is very difficult to obtain a stable calibration of yellow, based on lightness $L^*$.

TABLE 1

| $t_K$ [%] | Determined $L^*$ | $c_K$ [%] | Aimed $L^*_A$ | LUT $c_K \to t_K$ |
|---|---|---|---|---|
| 0 | 100 | 0 | 100 | 0 |
| 5 | 98 | 5 | 96 | 12 |
| 10 | 97 | 10 | 92 | 20 |
| 15 | 95 | 15 | 88 | 26 |
| 20 | 92 | 20 | 84 | 33 |
| 25 | 89 | 25 | 80 | 38 |
| 30 | 86 | 30 | 76 | 42 |
| 35 | 83 | 35 | 72 | 46 |
| 40 | 78 | 40 | 68 | 49 |
| 45 | 73 | 45 | 64 | 52 |
| 50 | 67 | 50 | 60 | 56 |
| 55 | 61 | 55 | 56 | 58 |
| 60 | 53 | 60 | 52 | 61 |
| 65 | 46 | 65 | 48 | 64 |
| 70 | 40 | 70 | 44 | 67 |

TABLE 1-continued

| $t_K$ [%] | Determined L* | $c_K$ [%] | Aimed L*$_A$ | LUT $c_K \rightarrow t_K$ |
|---|---|---|---|---|
| 75 | 35 | 75 | 40 | 70 |
| 80 | 31 | 80 | 36 | 74 |
| 85 | 27 | 85 | 32 | 79 |
| 90 | 24 | 90 | 28 | 84 |
| 95 | 22 | 95 | 24 | 90 |
| 100 | 20 | 100 | 20 | 100 |

Figure 1:
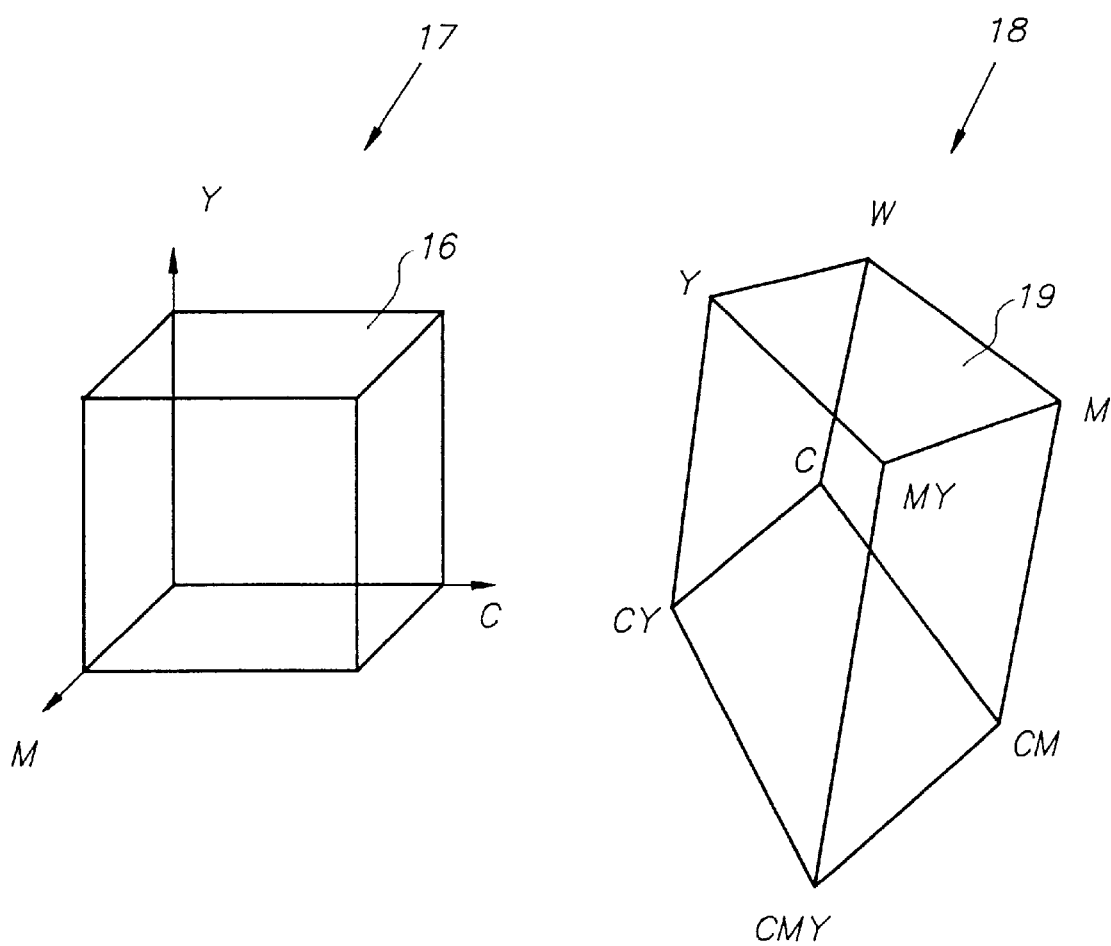
FIG. 1 represents the transformation between colorant space and colour space for a CMY process.
Figure 3:
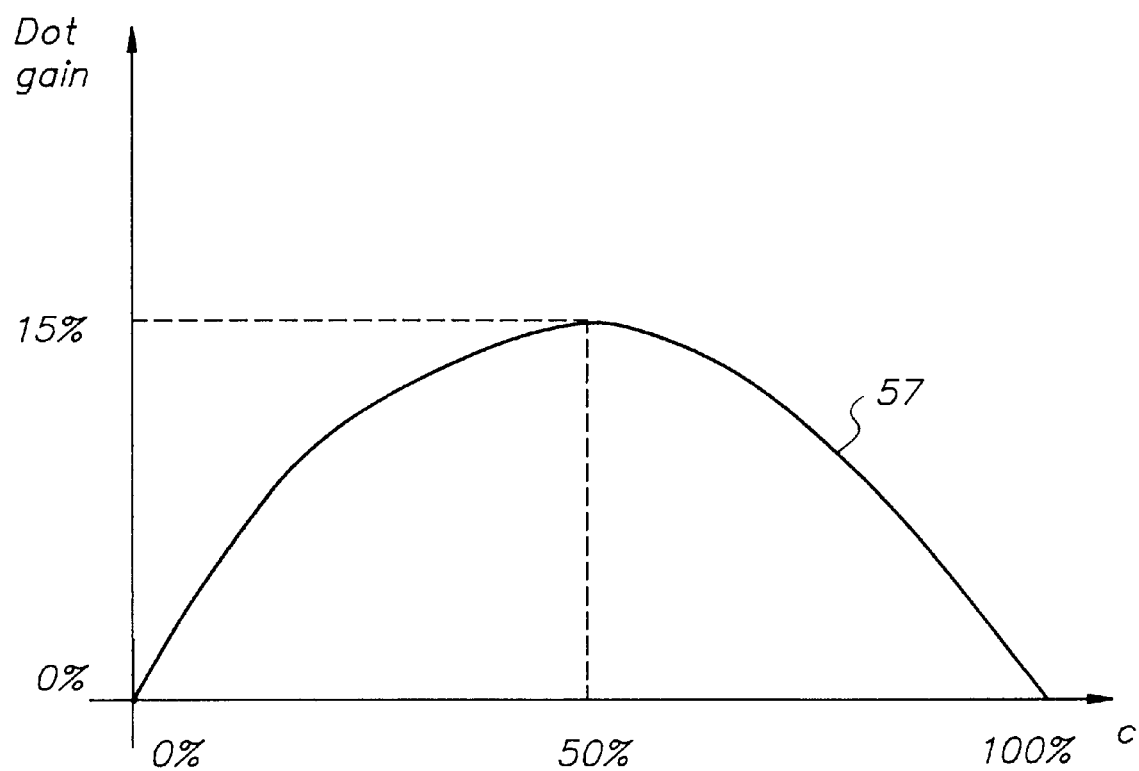
FIG. 3 is a typical dot gain curve for the graphic arts.
Figure 4:
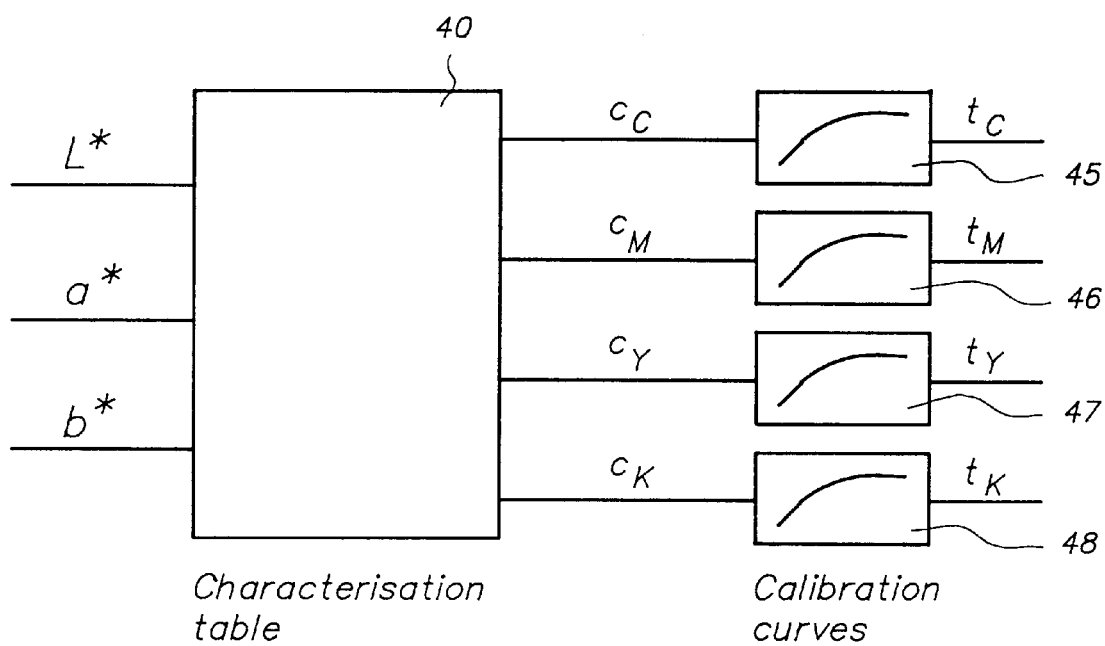
FIG. 4 shows a characterisation table and calibration curves of a Colour Management System (CMS)

Table 1 illustrates the calibration method of this example for black. A calibration target 15 as shown in FIG. 2, with twenty-one patches 21 per colorant, is printed by the multicolour output device. The calibration target is printed without applying a characterisation table and without applying calibration curves. print a specific patch 21 of the calibration target 15, the multicolour output device is addressed with a tone value t; see also FIG. 4: the calibration curves are 'bypassed' and the printer is directly addressed with the tone value t instead of with the colorant value c. For each of the twenty-one patches of the black wedge 13, with a value $t_K$ ranging from 0% to 100%, the magnitude of the lightness L* is determined, e.g. by means of a calorimeter. The lightness L* is measured relative to the 'white of the paper', i.e. L*=100 for the receiving substrate. The determined magnitude of L* is indicated in the second column of Table 1, while the first column gives the corresponding tone value $t_K$ in %. In fact, columns 1 and 2 of Table 1 correspond to the actually printed calibration target, columns 3 and 4 correspond to the desired situation, and column 5 gives the LUT that is used to obtain the desired situation. What is desired in this embodiment is a linear relation between the colorant value $c_K$, given in column 3 of Table 1 and used to address the printer when the calibration curves are not bypassed (see also FIG. 4), and the aimed lightness value L*$_A$ in column 4 of the table: L*$_A$=100−0.8*$C_K$. The aimed lightness value L*$_A$ is the value of L* that we would like to obtain for a given colorant value $c_K$; e.g. for $c_K$=25%, L*$_A$=100−0.8*25=80. To obtain this value L*$_A$=80, it is clear from the first two columns of Table 1 that the printer should be addressed with a tone value $t_K$ between 35% and 40%, since L*=83 for $t_K$=35% and L*=78 for $t_K$=40%; linear interpolation between (83, 35%) and (78, 40%) results in (80, 38%). Thus, the calibration method has to transform $c_K$=25% into $t_K$=38%; in this way (see also FIG. 4) a value of $c_K$=25% will cause the printer to be addressed with $t_K$=38% so that the printed colour will have an L*=80, even if the printer drifted away from its standard state. Therefore, for $c_K$=25%, $t_K$=38% is the corresponding value of the LUT or calibration curve; this value is given in the last column of Table 1. Thus, in this example, a specific colorant value $c_K$ in the third column of Table 1 is transformed by the LUT into a corresponding tone value $t_K$ that is equal to the LUT-value and that is given in the last column of Table 1.

A LUT is typically a one-dimensional array of N numbers, each number having a value in the range of 0 to M. A LUT is capable to realise a single-valued one-dimensional transform L( ), i.e. a transform having one argument or variable and one resulting target value. In this example, the transform is defined by $t_K$=L($c_K$) and the columns 3 and 5 of Table 1, which give respectively $c_K$ and the corresponding value $t_K$=L($c_K$). In fact, the LUT preferably has 256 entries, i.e. it is an array of 256 numbers with both $t_K$ and $c_K$ in the range from 0 to 255, instead of being expressed in % as in Table 1. The values of $t_K$ and $c_K$ in the range from 0 to 255 may be calculated as follows. Take for example the value $c_K$=204, which corresponds to $c_K$=204/255*100%=80%. From Table 1, it follows that L(80%)=74%, which corresponds to $t_K$=74/100*255=189. Take another example, $c_K$=19; this value in the range from 0 to 255 corresponds to $c_K$=19/255*100%=7.45% which is between 5% and 10%. From linear interpolation between the numbers given in Table 1, i.e. L(5%)=12% and L(10%)=20%, it follows that:

L(7.45%)=12+(20−12)*(7.45−5)/(10−5)=15.92% so that $t_K$=15.92/100*255=41 in the range from 0 to 255. Instead of linear interpolation, other interpolation or approximation techniques may be used; during the calculation, more or less than 2 digits to the right of the decimal point may be used; calculation results may be rounded to the nearest integer.

For the colorants cyan and magenta a LUT is filled out in a very similar. way, with the difference that the aimed L*$_A$ does not have a range of $\Delta L^*_A$=100−20=80 but e.g. a $\Delta L^*_A$=50. For yellow, instead of using CIE lightness, a magnitude of CIE chroma is determined and a CIE chroma value is aimed at.

The calibration method of this example has several advantages. As is clear from the explanation, the printer is brought in a standard state, which is defined by columns 3 and 4 of Table 1. Moreover, since L* is a psychovisual quantity, equal differences $\Delta L^*_A$ of aimed lightness values correspond to nearly equal differences in perceived lightness to an observer. Suppose that the printer is first calibrated in accordance with the example, and that then a grey linear step wedge is printed, the corrected tone values $t_K$=L($c_K$) being sent to the printer. Since column 4 of Table 1 shows that the differences $\Delta L^*_A$ between successive patches are equal, an observer will see a uniform smooth change between the successive patches of the grey wedge. That an observer sees a uniform smooth change is important because printing devices can only render a limited number of different shades of a specific colour—such as very light cyan, light cyan, medium cyan, dark cyan, etc. This number is limited because of many involved and often interrelated factors, such as the image resolution and the screening technique that are used, the number of bits that are used to represent a colour in different stages of the process, the number of levels of the halftoning process, technical (hardware) characteristics of the printer, etc. Because the number of different shades of a specific colour is limited, it is desirable to make use of this limited number as well as possible. To illustrate this, take for example a printer that would only be able to print one shade of light cyan and five shades of dark cyan; such a printer would not be able to print an image containing light cyan colour gradations with acceptable quality. Therefore, it is an important advantage that the calibration method of this first embodiment allows to space the different colour shades optimally over the available tonal range, and that the spacing is preferably based on a psychophysical quantity, more preferably on a psychovisual quantity, most preferably on a high quality psychovisual quantity. An observer will not only see uniform smooth colour changes in a linear step wedge but also, which is more important, in the vast quantity of images composed of diverse colours and colour ranges, that are printed by the printer.

Figure 7:
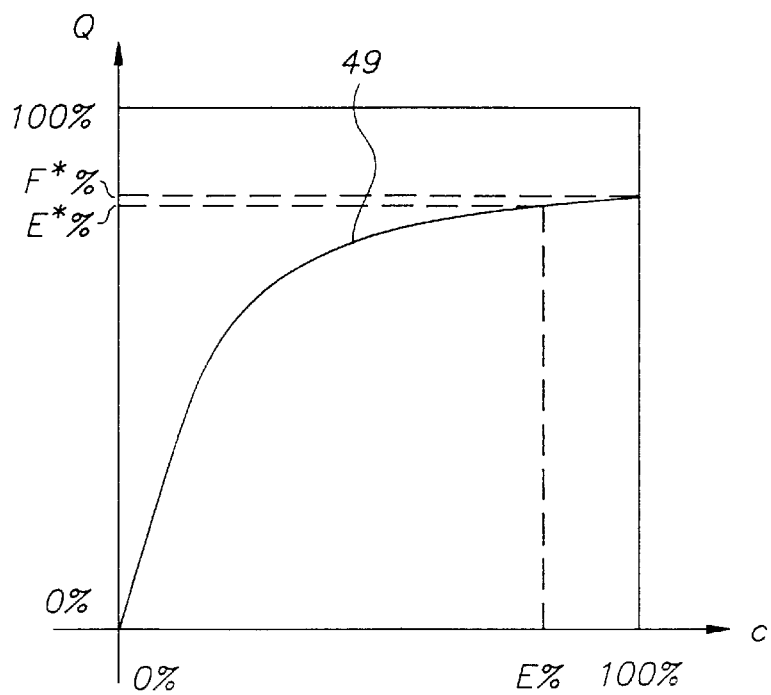
FIG. 7 and FIG. 8 show response curves.

The advantage of having a linear relation between the determined quantity and the colorant values of the wedge is that spacing of the colour shades over the available tonal range may be uniform, even equidistant. This may be illustrated by FIG. 7 which shows a non-linear response curve 49, that gives the relation between the colorant value c of a patch of the wedge and the corresponding determined quantity Q. All colorant values c between E % and 100% result in a determined quantity Q within the narrow range from E* % to F* %. If Q is e.g. CIE lightness L*, all the colorant values c between E % and 100% will cause patches to be printed that have nearly the same L*. A linear response curve on the other hand does not exhibit such 'compression zones' as the zone from E % to 100% in FIG. 7 which is compressed into the zone from E* % to F* %. To obtain the advantage of uniform or nearly uniform spacing, the relation between the determined quantity and the colorant values of the wedge does not have to be exactly linear but may be substantially linear. A relation q=f(c) is "substantially linear" if for a set of points $(c_1,q_1), (c_2,q_2), (c_3,q_3), \ldots (c_M,q_M)$, that are preferably equidistant along the c-axis such as the points $(c,L^*_A)$ in Table 1, and for $r^2$ as defined below, the following inequality is satisfied: $r^2>0.6$, preferably $r^2>0.8$, more preferably $r^2>0.9$, most preferably $r^2>0.95$, wherein $r^2$ is the correlation as known in linear regression in the field of statistics (see e.g. "Applied Statistics" by Neter, Wasserman and Whitmore, Allyn and Bacon Inc., 1988, chapter 18, page 610):

$$r^2 = \frac{\left(\sum (c_i - \overline{c}) \times (q_i - \overline{q})\right)^2}{\sum (c_i - \overline{c})^2 \times \sum (q_i - \overline{q})^2}$$

with the sums ranging from i=1 to i=M and with $\overline{c}$ and $\overline{q}$ respectively the mean values of the $c_i$ and the $q_i$.

Another advantage of having a substantially linear relation between the determined quantity and the colorant values of the wedge is that it is no longer necessary to use different characterisation targets for different printing systems such as for newspaper printing on the one hand and offset printing on the other hand, which are two systems with widely different dot gains. Having, preferably for all colorants, a substantially linear relation between the determined quantity and the colorant values of the wedge, which may also be called uniform sampling along the colorant axes, results—with regard to L* in the example—in a human observer seeing a uniform transition from the 'white of the paper' to 100% printed colour. Having such a uniform transition, preferably for all colorants of the printing device, is also much better than traditional calibration in case marking particles with different colorant hues are printed on top of each other or near each other, as is the case for many patches of a characterisation target.

In another example illustrating this first embodiment, the magnitudes of the determined quantity of a specific wedge, e.g. the magnitudes of L*, are used to determine a magnitude of a colour distance between a patch of the specific wedge and a patch of a reference wedge, preferably for several and more preferably for all patches of the specific wedge and of the reference wedge. The reference wedge may either be the specific wedge itself, so that colour distance magnitudes are determined between patches of the specific wedge, or the reference wedge may be another wedge, preferably a wedge that represents a standard state of the printing device. These determined colour distance magnitudes are then used to calibrate the printing device.

In a first case illustrating this calibration method, colour distance magnitudes between patches of a specific wedge are determined, and the determined colour distance magnitudes are redistributed over the patches of the specific wedge in order to obtain a uniform distribution. Preferably, in a first step, a calibration method is applied to the 0% patch and the 100% patch. A calibration method such as the one illustrated by Table 1 may be used, preferably combined with an additional mapping of the 100% patch, so that the 100% patch is made stable; this mapping is discussed below under the 'third embodiment'. Then, in a second step, the following colour distance is used:

$$d_1 = \sqrt{(\Delta L^*)^2 + (\Delta C^*)^2} \quad (1)$$

with $\Delta L^*=L^*_B-L^*_A$ the difference of the magnitudes of L* between two patches A and B of the wedge, and with $\Delta C^*=C^*_B-C^*_A$ the difference of CIE chroma C* between these patches A and B. A table may be made, similar to Table 1, but wherein the determined magnitudes of L* are replaced by the determined magnitudes of $d_1$. This table contains in one row the value $t_K$=5% and the associated colour distance $d_1$(0%,5%) between the patches $t_K$=0% and $t_K$=5%, in another row $t_K$=10% and the associated magnitude $d_1$(5%, 10%), etc., and in the last row $t_K$=100% and $d_1$(95%,100%). Next, a mean colour distance $d_{MEAN}$ is calculated as:

$$d_{MEAN} = \frac{\sum d_i}{N}$$

with the sum ranging from i=1 to i=N and with N the number of colour distances $d_i$. Next, by using an interpolation or approximation technique in the table, the tone values are calculated that would result in all colour distances $d_1$(0%, 5%)=$d_1$(5%,10%)=. . . =$d_1$(95%,100%)=$d_{MEAN}$. Then a LUT is set up that transforms the colorant values to these tone values. In this way, the determined colour distance magnitudes are redistributed over the patches of the wedge and a uniform distribution is obtained.

Because, in a first step, the 0% patch and the 100% patch are made to correspond with certain given values, and in a second step the colour distance magnitudes are uniformly redistributed, the printer is brought in a standard state. In fact, when printing patches of a wedge from a 0% patch to a 100% patch, the colour of the printed patches will vary along a curve in the colour space wherein the colour distance is defined. The 0% patch and the 100% patch are made to correspond with given points on this curve in the first step of the calibration; therefore, because of the uniform distribution between the 0% and 100% patches in the second step, the patches between 0% and 100% also correspond to fixed points, and thus the printer is brought in a standard state. The curve in colour space along which the colour of the printed patches varies may be considered to be a fixed curve; exceptionally, this curve may move slightly in colour space if e.g. the yellow ink gets contaminated with black ink, but such an exceptional case cannot be corrected by calibration anyway. Further, if the first step concerning the 0% and 100% patches is left out, the resulting calibration method is very often quite satisfactory.

Advantages of this calibration method, that is based on a colour distance, are uniform smooth colour changes in printed images, a uniform spacing of the colour shades over the available tonal range, the possibility to use a characterisation target for which the sampling along the colorant axes is uniform, all of which are discussed above. Moreover, an advantage of using the specific colour distance $d_1$ defined in equation (1) is that it offers good results for the colorants C, M, Y and K, since it is based on L* and on C*. On the other hand, as discussed already above, the calibration method illustrated by Table 1 and only based on L* is especially suitable for C, M and K, but not very suitable for Y, and the calibration method that is only based on C* is especially suitable for yellow, but not for black. An additional advantage is that the curve, along which the colour of the printed patches varies, does not have to be monotonely ascending or monotonely descending. To illustrate this, suppose that no colour distance is used and that the determined quantity Q varies in a non-monotone way, e.g. Q(50%)=20, Q(55%)= 25, Q(60%)=20 again. A calibration method as the one illustrated by Table 1 then runs into problems. For the calibration method described above, that uses a colour distance, non-monotone variations do not cause a problem.

In a second case illustrating this calibration method, a well known colour distance such as:

$$\Delta E^*_{ab} = \sqrt{(\Delta L^*)^2 + (\Delta a^*)^2 + (\Delta b^*)^2} \qquad (2)$$

or:

$$\Delta E^*_{uv} = \sqrt{(\Delta L^*)^2 + (\Delta u^*)^2 + (\Delta v^*)^2} \qquad (3)$$

may be used; see [Hunt], section 8.8, 'Uniform colour spaces', for $\Delta E^*_{ab}$ and $\Delta E^*_{uv}$. This again offers the advantages of uniform smooth colour changes in printed images, a uniform spacing of the colour shades over the available tonal range, the possibility to use a characterisation target for which the sampling along the colorant axes is uniform, good results for all colorants, applicability to non-monotone curves.

In a third case illustrating this calibration method, the reference wedge represents a standard state of the printer. A colour distance is used which may be defined by equation (1), (2), (3) or by another equation as known in the art. Magnitudes of this colour distance are determined between a patch A of the specific wedge, which may be a yellow wedge if the colorant yellow is to be calibrated, and patches $R_1, R_2, R_3, \ldots$ of the reference wedge, which may represent the standard state for yellow. Then, the value of the reference wedge is determined that is 'nearest' to patch A, i.e. that corresponds to the smallest distance. Suppose for example that patch A is the 20% patch, then from the distances between this 20% patch and the patches of the reference wedge of 15%, 20%, 25% it may result, by using an approximation technique, that 22% of the reference wedge is 'nearest' to 20% of the specific wedge. The LUT then has to transform $c_K$=22% to $t_K$=20%.

In this first embodiment, it is assumed that applying the maximum amount of marking particles results in stable colour rendering, i.e. that the 100% patches of the different wedges are stable. How instabilities may be handled, is disclosed below, in a third embodiment.

Figure 5:
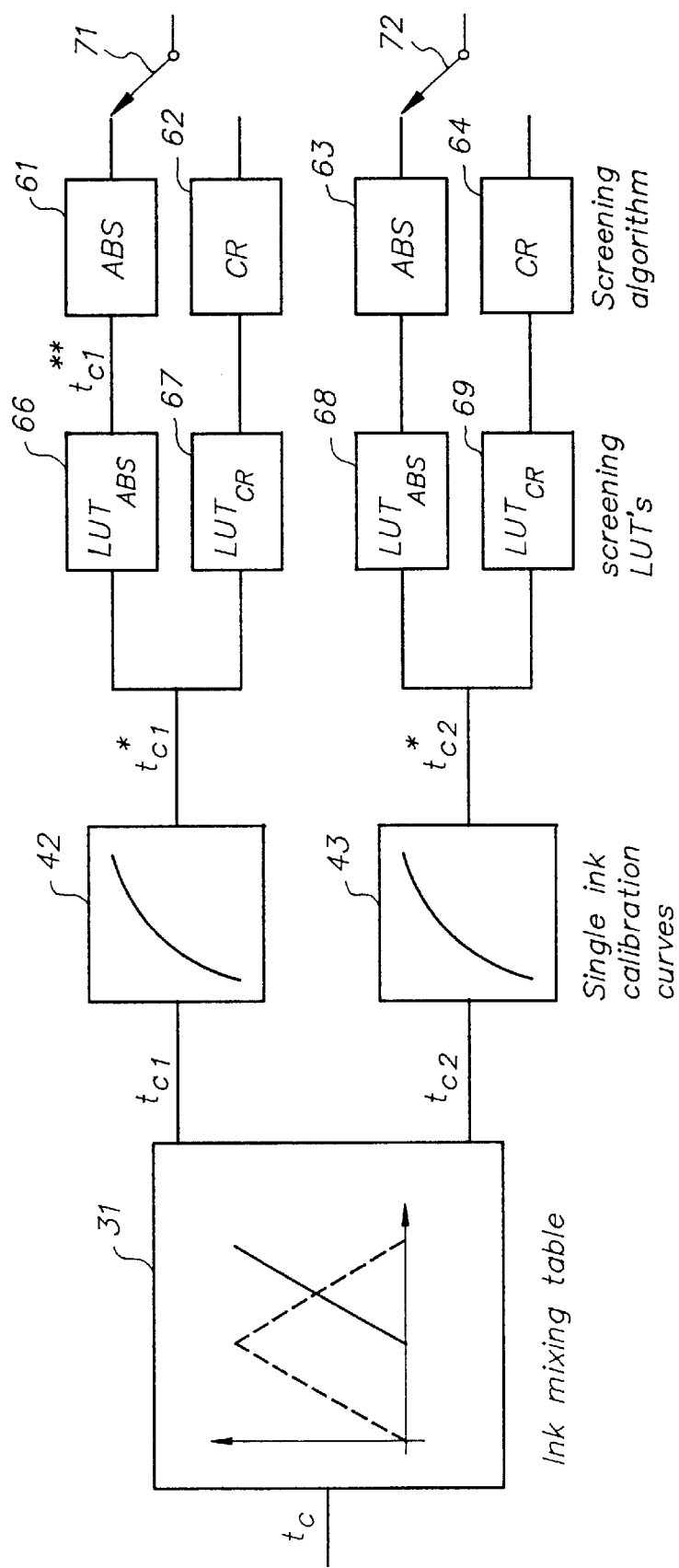
FIG. 5 illustrates the use of a mixing table and the use of screening dependent calibration curves.
Figure 6:
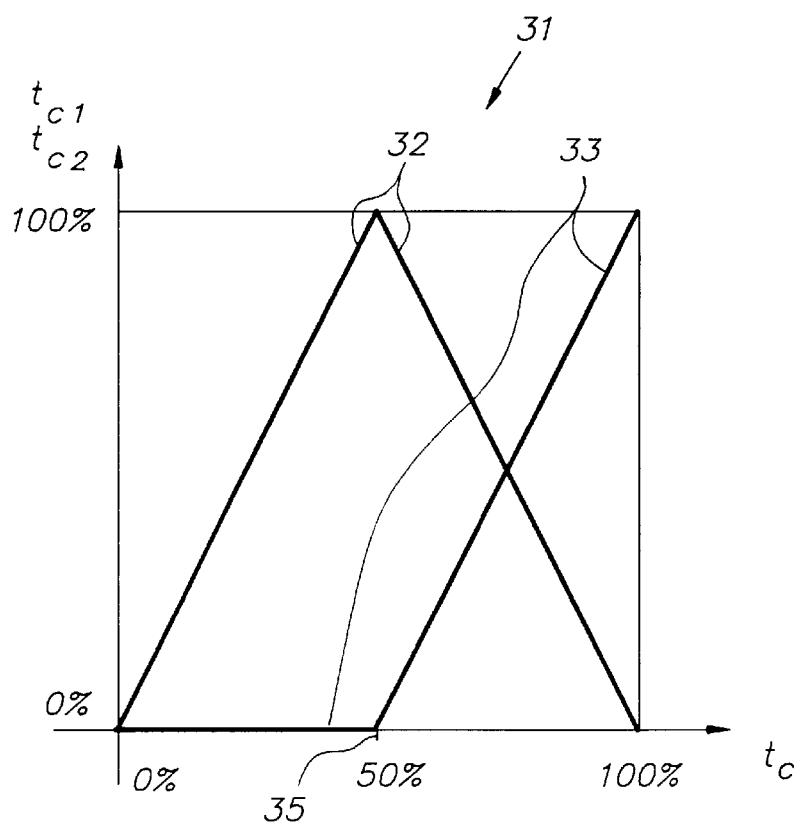
FIG. 6 shows a mixing table.

A calibration method according to this first embodiment can also be applied to multicolour output devices that use, for at least one colorant, two or more types of marking particles per colorant, e.g. light cyan marking particles and dark cyan marking particles. A calibration method according to this first embodiment may be applied to 'single marking particle' calibration, which corresponds in FIG. 5 to LUT's 42 and 43, independently from each other, or to 'mixtures of marking particles' calibration, which may correspond in FIG. 4 to LUT's 45 to 48 in conjunction with mixing tables such as mixing table 31 shown in FIG. 5, or, which is preferred, to both. Applying a calibration method according to this first embodiment has the advantages that image quality is not degraded and that significantly better results are obtained when compared with traditional calibration techniques based on densities and dot gain. When applying several types of marking particles per colorant, such as light cyan and dark cyan marking particles for the colorant cyan, mixing tables are used, which are called ink mixing tables in case the marking particles are liquid ink drops, such as for ink-jet printers. FIG. 6 shows a mixing table 31 for cyan that transforms the global tone value for cyan $t_C$ into a first value $t_{C1}$ via curve 32 and into a second value $t_{C2}$ via curve 33; the values $t_{C1}$ and $t_{C2}$ ultimately determine respectively an amount of light cyan marking particles and an amount of dark cyan marking particles that are to be applied to a receiving substrate. FIG. 6 shows a switching point 35 at a value $t_C$=50%. A switching point is a point at which there is a change in the types of marking particles that are to be used; in FIG. 6, for tone values less than the value of 50% of the switching point, only light cyan marking particles are used, in an amount of $t_{C1}$, while for tone values larger than 50% both light and dark cyan marking particles are used, in an amount of $t_{C1}$ and $t_{C2}$ respectively.

In a preferred embodiment, one or more and preferably all switching points in the mixing tables are used in the calibration target 15, i.e. one patch of the concerned wedge is printed with a tone value t set at the switching point (for the example of FIG. 6, the cyan wedge preferably comprises a patch at $t_C$=50%). In another preferred embodiment, the colorant values c of colorants that are transformed by the calibration curves (see FIG. 4) into tone values t corresponding to switching points, such as $t_C$=50% in FIG. 6, are used in the characterisation target. Even more preferably, the switching points are used in the calibration target and the points transformed into switching points are used in the characterisation target.

A calibration method according to this first embodiment can also be applied to printing devices that use either one type of marking particles or two or more types of marking particles that have the same colorant hue. A first example is a printer using black marking particles. A second example is a printer using light-grey, mid-grey and dark-grey marking particles. Both printers may e.g. be calibrated by determining the quantity CIE lightness L*.

In a second embodiment, two or more different types of screening are used, as discussed above, and the invention is applied to screening dependent calibration curves or LUT's such as (see FIG. 5) LUT 66 for Agfa Balanced Screening™ and LUT 67 for CristalRaster™. Preferably, in the example of FIG. 5, the invention is applied to all screening dependent LUT's 66 to 69. One embodiment for applying the method according to the present invention to create $LUT_{ABS}$ 66 is as follows. A test wedge 10 is printed. Each patch 21 of the wedge is formed by giving $t_{C1}$** (see FIG. 5) a value from 0% to 100% in increments of 5%, thereby generating 21 test patches. CIE lightness L* is determined for each of the 21 test patches (see also Table 1 above, column 2). A standard state is defined as $L_A$*=G($t_{C1}$*) (see also standard state $c_K$, $L_A$* in columns 3 and 4 of Table 1). The values for the $LUT_{ABS}$ 66 for transforming $t_{C1}$* to $t_{C1}$** are computed as set out in conjunction with Table 1 and are downloaded in $LUT_{ABS}$ 66. The procedure set out above applies to cyan; for yellow the same procedure is followed but another quantity is determined, preferably chroma. FIG. 5 just represents an example of single ink calibration curves (curves 42 and 43 for cyan) and of screening dependent calibration curves. The invention may also be applied to other configurations than the one shown in FIG. 5, as is clear to those skilled in the art: the order of the operations and transformations shown in FIG. 5 may be different, there may be more or less operations or transformations than in FIG. 5, the transformation 42 may be incorporated into transformations 66 and 67 or the transformation 67 may be incorporated in the screening algorithm 62 as disclosed in EP-A-0 639 023, etc. What is important in this second embodiment is that the screening algorithm and the screening dependent LUT are in the same branch of the process, so that the screening dependent LUT may be adapted to the properties of the specific screening algorithm. An advantage of a calibration method as set out above is that an observer does not see a significant difference between an image screened with a first screening technique such as ABS and an image screened with a second screening technique, different from the first one, such as CR.

A third embodiment is concerned with a printing device that is not stable due to the fact that the maximum amount of marking particles, that the device applies to the receiving substrate, changes over time for one or for more colorants. Because of this instability, the 100% patch will look less or more saturated, and/or it will look lighter or darker, when compared to a previous print of the same 100% patch. In reality, less or more marking particles will be used for some colorants and hence this change will affect most of the colour combinations in the final print.

An advantage of this embodiment is that the calibration method compensates for this effect, so that, as opposed to traditional calibration methods, it is not necessary to make a new characterisation table for the printer, which is very cumbersome.

In this embodiment the aim curve may be chosen as follows—the aim curve is the result that the calibration aims to achieve, such as the aimed lightness value $L^*_A$ in the first embodiment discussed above. In the case being discussed the aim curve may correspond to measurements of the calibration target immediately after factory calibration. The factory calibration target was printed and measured at the same time that the characterisation target was printed; preferably both this characterisation target and the factory calibration target were printed without applying calibration curves. Hence, this aim curve represents the situation at the time the characterisation was made. By calibrating the system according to this aim curve, the output device is put in the same standard state as the one for which the characterisation table is valid. For the calibration, in principle any quantity may be determined.

Let us assume, for example, that the 100% patch for yellow is not stable. This is a typical situation for an ink-jet printer for which some nozzles for yellow ink do not work any more, so that, at first, less yellow ink is applied to the receiving substrate. In some printers, extra backup nozzles are provided that do not operate when the printer is used for the first time. In some printing systems, a vision system may be used to detect the nozzles that are out of order so that they may be replaced by some of the extra backup nozzles. If the vision system is not accurate, either too little or too much yellow ink may be applied to the receiving substrate. As discussed above, preferably the quantity chroma as defined in CIELAB space is determined in order to check the amount of yellow ink. If the printing system, which possibly includes a vision system, is such that the chroma of the 100% yellow patch increases over time, then the calibration curve of this third embodiment will map a value of $c_Y=100\%$ to a value of $t_Y$ that is smaller than 100%, e.g. $t_Y=95\%$, so that the printer is addressed with this smaller value of e.g. 95% which will however result in a printed patch of 100% since the printer uses too much ink. If, on the other hand, the printing system is such that the chroma of the 100% yellow patch decreases over time, then some parts of the gamut of the printer will be lost and hence the characterisation table cannot be used properly. This problem may be solved as follows. The maximum possible amount of yellow ink that the printer can apply is called 100% of ink. Suppose that the printer applies 90% respectively 100% of yellow ink when addressed with a value of 90% respectively 100%. Then, preferably, the calibration curve in the beginning, i.e. in the factory or when the printer comes fresh from the factory, maps a value of $c_Y=100\%$ to a value of $t_Y$ that is smaller than 100%, e.g. $t_Y=90\%$, so that in the beginning, when printing a 100% patch, not the maximum possible amount of ink is applied to the receiving substrate but a smaller amount (e.g. 90%) is applied, and the remainder (e.g. 10%) is kept as 'backup ink' for the future. The calibration curve, mapping $c_Y$ to $t_Y$, may then be a straight line between the points $(c_Y,t_Y)=(0, 0)$ and $(c_Y,t_Y)=(100\%, 90\%)$. of course this mapping, of e.g. $c_Y=100\%$ to $t_Y=90\%$, results in a loss of gamut of the printer, but the advantage is that the 100% patch is stable, which is much more important for an observer than a small loss of gamut; moreover the loss of gamut would occur anyway, only later. The value of $t_Y$ to which $c_Y=100\%$ is mapped is preferably chosen so that the loss of printer gamut, resulting from the mapping, is difficult to be observed; this value of $t_Y$ depends upon the original printer gamut, and thus upon the printer characteristics that determine the printer gamut. This value of $t_Y$ is typically 90% for digital colour proofing applications; the value of 90% results from comparing the gamut of the offset printing press, for which the proof is to be made, with the gamut of the printer that prints the colour proof.

Figure 8:
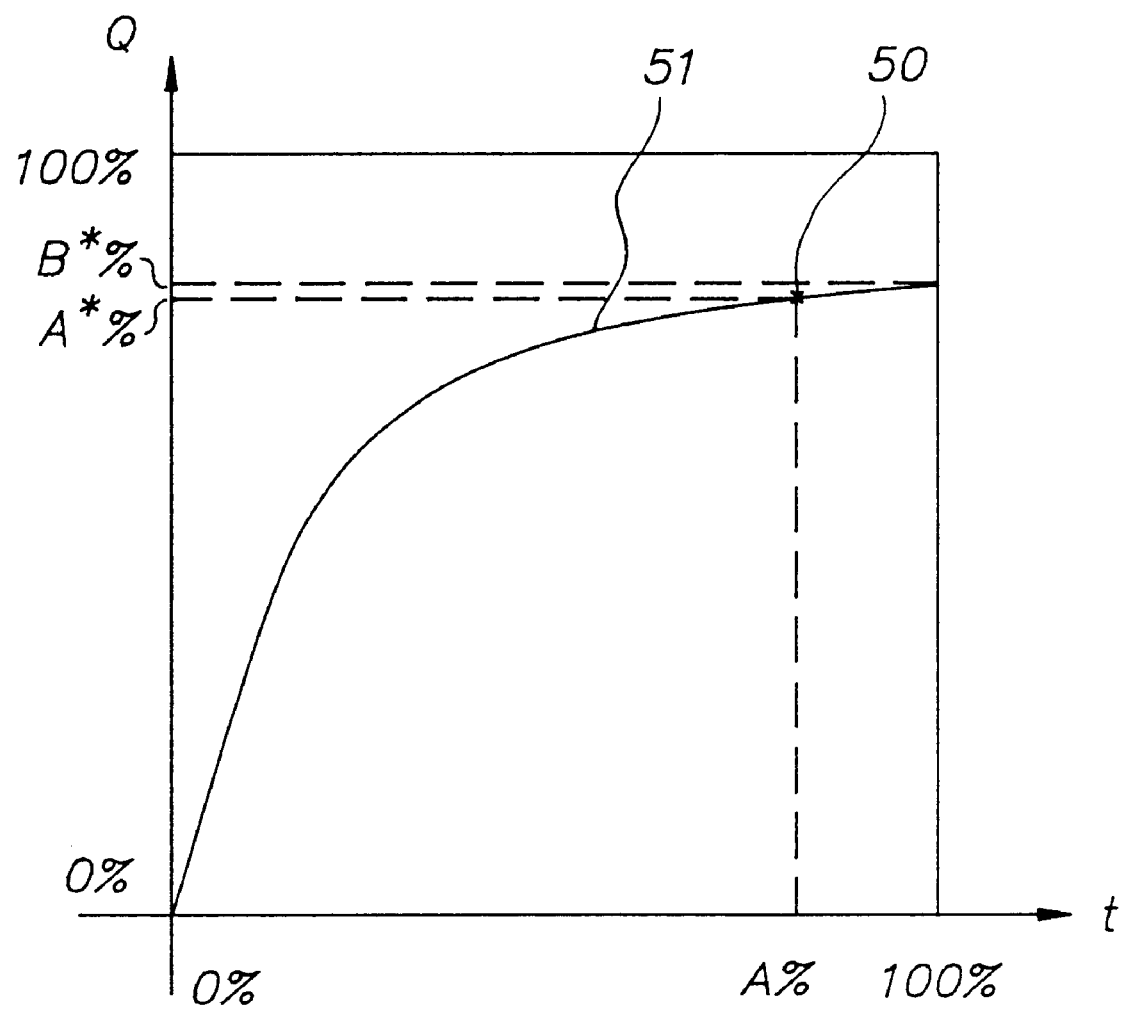

A fourth embodiment is concerned with a printing device or a multicolour output device for which there are almost no colour differences between the patches of a wedge in a specific tone value interval, usually an interval from a specific tone value A % to 100%. Whether such a case occurs or not depends upon the characteristics of the complete system that comprises printer, marking particles, receiving substrate. A typical response curve for such a case may look like curve 51 in FIG. 8, which gives the magnitudes of a quantity Q, such as CIE lightness L*, as a function of tone value t. Curve 51 shows a "saturation point" 50 at t=A %. In a calibration method of this fourth embodiment, the tone values t are preferably clipped at the saturation level of A %, which means that the original t-interval from 0 to A % is rescaled to the interval from 0 to 100%. The error that is made by this clipping operation is quite small, since originally the tone values t between A % and 100% resulted in a magnitude of Q between A* % and B* %, and B* is nearly equal to A*, as is clear from FIG. 8. The advantage of the clipping operation is that the average spacing between the t-levels in the interval from 0 to A % may be smaller, which results in more accurate colour representation, as is explained now. Suppose that 8 bits are used to represent each colorant (this makes a total of 32 bits per pixel for a CMYK printer). This means that $256=2^8$ different t-values or t-levels are available for each colorant. Without clipping, these 256 levels are spaced between 0 and 100%, which means that the average spacing between two levels is 100/ (256−1)=0.39%. Suppose that A=80%, then the 256 levels may all be chosen inside the interval from 0 to A %, so that clipping results in an average spacing of 80/(256−1)=0.31%. Thus, because of clipping, colours may be represented more accurately, resulting in a higher colour quality of the printed image. Remark: either a constant spacing between the t-levels may be chosen or a variable spacing; in both cases, the average spacing is smaller when a clipping operation is applied.

The saturation point 50 may also lie near the 0% point, in case there are almost no colour differences between the patches of the wedge in a tone value interval from 0% to C % (not shown in the drawings), with e.g. C=12%. There may even be two saturation points, the first one near 0% and the second one near 100%. For a response curve having two saturation points, e.g. at C % and at A %, preferably a clipping operation is performed at a saturation point and more preferably at both saturation points; in the latter case, all t-levels will be spaced inside the t-interval from C to A %.

A saturation point is defined as follows. Let Q=f(t) be a response curve, with Q and t both expressed in %. If the response curve Q=f(t) exhibits a substantially constant t-zone, delimited either by t=0% and t=S % or delimited by t=S % and t=100%, then the point of the response curve at t=S % is a saturation point and S % is a "saturation level". Let |q| represent the absolute value of q. A substantially constant t-zone is a zone in which, for each pair of different points $(t_1, Q_1)$, $(t_2, Q_2)$ inside the zone, with $\Delta t = t_2 - t_1 \% > 0\%$ and $\Delta Q = |Q_2 - Q_1| \% \geq 0\%$, the ratio $\Delta Q/\Delta t < R$, with R=0.25, preferably R=0.2, more preferably R=0.1, most preferably R=0.0.

Two or more 'single' calibration curves of embodiments disclosed above may also be combined with each other, i.e. applied as successive transformations. For example a calibration curve discussed under the third embodiment, to solve an instability problem of a 100% patch, may be applied before or after a calibration curve—or LUT—discussed in connection with Table 1. Preferably, the combination of the single calibration curves results in a single 'combined' calibration curve or LUT, that applies the combined transformation that is obtained by applying successively the single transformations of the single calibration curves.

The invention may be applied to ink-jet printing. The printing device is then an ink-jet printing device and the marking particles are liquid ink drops. The invention is especially suitable for ink-jet printing, because in ink-jet printing it is quite common to use a plurality of different types of inks of the same colorant hue, such as light cyan ink and dark cyan ink; as explained above, the invention has additional advantages in such a case. Another advantage of using ink-jet is that, as may be read in the literature, ink-jet printing heads are available or will be available in the near future, that offer a resolution of 1200 dpi (i.e. 1200 dots per inch, or 47 dots per mm). Such a high resolution is advantageous for digital colour proofing with very good colour quality. Yet another advantage is that using ink-jet for proofing is relatively inexpensive, when compared with other technologies, such as electro(stato)graphic printing.

As stated above, the invention may also be applied to other image reproduction processes such as thermal transfer printing, laser induced melt transfer printing, electro(stato) graphic printing; it may also be applied to a microchannel printing device as disclosed in U.S. Pat. No. 5,886,722 or to an ink transfer printing device as disclosed in U.S. Pat. No. 5,745,128.

The invention is also especially suitable for digital colour proofing, because of the high requirements of colour proofing with respect to colour quality. The invention may also be used for other applications such as monochrome proofing, making high-quality colour prints, making high-quality monochrome prints.

The invention is not limited to the embodiments described hereinbefore. The colorants may have the traditional four colorant hues cyan, magenta, yellow and black; they may have other colorant hues; they may have less or more than four colorant hues; examples are a HiFi Color™ system such as the six colour-system of the Hexachrome™ process, by Pantone® Inc, and duotone colours, which are two shades of the same colour. The invention may be applied to printing devices that use only marking particles having the same colorant hue; an example is a printing device using black marking particles and used for medical purposes. The printing device may also be a multicolour output device, which uses marking particles of at least two different colorant hues.

Having described in detail preferred embodiments of the current invention, it will now be apparent to those skilled in the art that numerous modifications can be made therein without departing from the scope of the invention as defined in the appending claims.

List of Reference Signs

10: wedge
11: wedge
12: wedge
13: wedge
15: calibration target
16: colorant gamut
17: colorant space
18: colour space
19: colour gamut
21: patch
31: mixing table
32: curve
33: curve
35: switching point
40: characterisation table
42: calibration curve
43: calibration curve
45: calibration curve
46: calibration curve
47: calibration curve
48: calibration curve
49: curve
50: point
51: curve
57: dot gain curve
61: Screening algorithm
62: Screening algorithm
63: Screening algorithm
64: Screening algorithm
66: Lookup table
67: Lookup table
68: Lookup table
69: Lookup table
71: selector switch
72: selector switch

What is claimed is:

1. A method for calibrating a printing device, comprising:
   printing by said printing device a first wedge;
   printing by said printing device a second wedge, different from said first wedge;
   determining for at least one patch of said first wedge a first magnitude of a first quantity, wherein said first quantity is selected from the group of a psychophysical quantity and a psychovisual quantity;
   determining for at least one patch of said second wedge a second magnitude of a second quantity, wherein said second quantity is different from said first quantity; and
   using said first magnitude and said second magnitude in calibrating said printing device.

2. The method according to claim 1 wherein said first wedge is a yellow wedge and wherein said first quantity indicates colourfulness.

3. The method according to claim 1 wherein said printing device is a multicolour output device.

4. The method according to claim 3 wherein said second quantity indicates brightness.

5. The method according to claim 1, wherein each patch of said first wedge has a colorant value for printing said patch by said printing device and wherein there is a substantially linear relation between said first quantity and said colorant values.

6. The method according to claim 1, wherein a third wedge is printed using amounts of a plurality of types of marking particles, said amounts being determined by means of a mixing table having a switching point, said third wedge comprising a patch for being printed at said switching point.

7. The method according to claim 1, further comprising:
mapping a first value for addressing said printing device to a second value for addressing said printing device;
wherein said first value is for printing a 100% patch of a wedge on a receiving substrate by applying an amount of second marking particles to said receiving substrate, and
wherein said second value is smaller than a value for addressing said printing device for applying a maximum possible amount of said second marking particles when said printing device comes fresh from the factory.

8. The method according to claim 1, further comprising:
determining a response curve giving for each tone value for addressing said printing device a corresponding magnitude of a quantity;
determining a saturation level of said response curve; and
clipping said tone values at said saturation level.

9. A system comprising:
a printer for printing a first wedge having at least one first patch and a second wedge having at least one second patch, wherein said second wedge is different from said first wedge;
a first quantifier for determining for each first patch a first magnitude of a first quantity, wherein said first quantity is selected from the group of a psychophysical quantity and a psychovisual quantity;
a first calibrator for calibrating said printer based on said first magnitude;
a second quantifier for determining for each second patch a second magnitude of a second quantity, wherein said second quantity is different from said first quantity; and
a second calibrator for calibrating said printer based on said second magnitude.

10. The system according to claim 9, wherein said second quantifier equals said first quantifier and said second calibrator equals said first calibrator.

11. The system according to claim 9, further comprising a transmitter for transmitting signals from said first and said second quantifier to said printer.

12. The system according to claim 9, wherein said first wedge is printed on a receiving substrate, the system further comprising a mover for moving said receiving substrate with respect to said printer when printing said first wedge, said mover comprising a gripper for gripping said receiving substrate during said moving operation, wherein said gripper is for gripping said receiving substrate when determining said first magnitude for each patch of said first wedge by said first quantifier.

13. The system according to claim 9 wherein said first quantifier comprises a measuring instrument selected from the group of a colorimeter and a spectrophotometer.

14. The system according to claim 9 wherein said printer is selected from the group of a black and white ink-jet printer and a multicolour ink-jet printer.

* * * * *